(12) United States Patent
Heliot et al.

(10) Patent No.: US 6,963,803 B2
(45) Date of Patent: Nov. 8, 2005

(54) SYSTEM AND METHOD FOR ANALYZING A THIN BED FORMATION

(75) Inventors: Denis Heliot, Sugar Land, TX (US); Jacques R. Tabanou, Houston, TX (US); Jaideva C. Goswami, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 96 days.

(21) Appl. No.: 10/708,012

(22) Filed: Feb. 2, 2004

(65) Prior Publication Data

US 2005/0171697 A1    Aug. 4, 2005

(51) Int. Cl.[7] .............................................. G06G 7/48
(52) U.S. Cl. ...................................................... 702/11
(58) Field of Search ........................... 702/6, 7, 10, 11; 324/338, 339; 703/10

(56) References Cited

U.S. PATENT DOCUMENTS 5,461,562 A    10/1995  Tabanou et al.

2002/0133323 A1 *  9/2002  Dahlberg ..................... 703/10

* cited by examiner

Primary Examiner—Donald McElheny, Jr.
(74) Attorney, Agent, or Firm—Kevin P. McEnaney; Victor H. Segura; Dale V. Gaudier (57) ABSTRACT

One or more high resolution logs of a formation property having thin beds is provided for the laminated formation. From this log, the bed boundaries are detected and the facies for each of the beds detected is identified, using one or more high resolution logs of the laminated formation. Each of the identified facies is then defined. One or more squared logs for formation property is then generated by using the imported volumetric descriptions of the facies to generate a value of the formation property for each of the beds. A reconstructed log is generated and compared with a low resolution log of the formation property for laminated formation. By adjusting the values of the squared log the difference between the reconstructed log and the squared log may be minimized. An optimized squared log is output as having the square log and the volumetric analyses thereon.

38 Claims, 8 Drawing Sheets

SYSTEM AND METHOD FOR ANALYZING A THIN BED FORMATION

BACKGROUND OF INVENTION

The present invention relates generally to a system and method for analyzing formations. More particularly, the invention relates to such a system and method for determining certain physical characteristics or properties associated with each of the layers of a laminated formations having thin beds therein ("thin bed formations"). Alternatively, the invention relates to such a system and method of estimating the values of physical property(ies) of each of the layers of the laminated formation.

For purposes of the present description, thin bed form ations, or thin beds, are beds that are generally thinner than the vertical response of the well logging tool. Generally, these will describe beds that have a thickness in the range of about 5 to 60 cm (2 inch to 2 feet). Thinner beds or (very thin beds) are defined as those beds having thicknesses in the range of about 1 to 5 cm (0.5 to 2 inches). Some formations having a thickness of less than one cm are often referred to as lamina. The inventive system and method are particularly suited for analyzing laminations which might include such thin bed formations and, more particularly, estimating or determining certain physical characteristics or properties of these laminated form ations.

Thin bed formations can provide a good productive reservoir because these combine reservoir, source rock and permeability barriers. However, because of their reduced thicknesses, these formations are often difficult to estimate, characterize or otherwise analyze. This difficulty arises from the limitations of present-day logging tools, more particularly, because present logging tools measure formation properties by averaging the properties over regions much larger than the thin bed formation. Accordingly, there is a potential for underestimating the hydrocarbon volume within the thin bed formation.

In a prior art method, thin bed formations are characterized by using very high resolution resistivity measurements to locate bed boundaries and classify beds between the boundaries under a few lithofacies ("facies"). Each bed is assumed to have a constant value for the properties. Generally, these properties are determined by minimizing the difference between a reconstructed log (convolved from the squared high resolution log) and a log developed from low resolution measurements in the wellbore.

SUMMARY OF INVENTION

The present invention relates generally to a system and method for analyzing formations. More particularly, the invention relates to such a system and method for determining certain physical characteristics or properties associated with each of the layers of a laminated formations having thin beds therein ("thin bed formations"). Alternatively, the invention relates to such a system and method of estimating the values of physical property(ies) of each of the layers of the laminated formation.

Accordingly, in one aspect of the invention, a method is provided for determining a physical characteristic associated with a plurality of layers of a laminated formation traversed by a wellbore. First, one or more high resolution logs of a formation property is provided for the laminated formation. From a high resolution log, the bed boundaries of the laminated formation are detected and, thus, the individual beds disposed between the boundaries are detected. The method further calls for importing a set of defined facies associated with the laminated formation, including importing a volumetric description with each of the defined facies. A defined facies, and the volumetric description associated therewith, are assigned to each of the beds detected. Then, at least one squared log is generated for a formation property. This includes using imported volumetric descriptions of the facies for a plurality of beds to generate a value of the formation property for each of the beds. In a preferred method, this includes computing an initial property value for a bed from the volumetric description assigned to the bed.

The generated squared log is then compared with a measured log of the formation property for the laminated formation and then, the values of the squared log are adjusted. After repeating, one or more times, these adjusting and comparing steps, an adjusted squared log is selected as an optimized square log of the formation property.

In some applications, a volumetric analysis is performed on the optimized squared log. Preferably, the optimized squared log and the corresponding volumetric analyses of the squared log are stored on an output record medium, and such that, the volumetric analyses illustrates each layer of the plurality of layers of the laminated formation. In a further application of the method, the laminated formation includes thin beds, and the storing step includes storing volumetric analyses that includes an illustration of each of the thin bed layers in the laminated formation.

Preferably, the step of generating a squared log includes determining minimum and maximum constraints for the formation property values for a plurality of the beds. Such minimum and maximum constraints are derived from the imported volumetric descriptions associated with each bed. Thus, the adjusting step includes adjusting the values of the squared log within corresponding minimum and maximum constraints.

Moreover, the comparing step includes generating a reconstructed log from the squared log (e.g., by employing a convolution filter to convolve the squared log) and comparing the reconstructed log with the measured log. The adjusting step includes, therefore, adjusting the values of the squared log to minimize the difference between the reconstructed log and the measured log. Further, the step of generating at least one squared log may include generating a plurality of squared logs of different formation properties. Each of the comparing and adjusting steps are performed, therefore, in respect to a plurality of reconstructed logs generated from the plurality of squared logs and a plurality of measured low resolution logs for the different formation properties. In this way, a plurality of optimized squared logs is selected. Moreover, each of the comparing and adjusting steps may be performed simultaneously in respect to the plurality of generated reconstructed logs and the plurality of measured low resolution logs.

As mentioned above, the inventive method is particularly suited for application in respect to a thin bed formation. In this application, the boundaries for a plurality of thin beds are detected, and one of the defined facies is assigned to one of the thin beds. Preferably, the assigning step includes squaring the high resolution log and obtaining a property value, from the high resolution log, for each of the thin beds. Then, the property value is matched with a value derived from a volumetric description associated with one of the defined facies, thereby assigning one of the defined facies with a thin bed. This assigning step may further include assigning each of the thin beds a volumetric description derived from a thick bed located in the same laminated formation.

In one aspect of the invention, a method of estimating the values of a formation property for a plurality of layers of a laminated formation is provided, wherein, the laminated formation has thin beds therein and is traversed by a wellbore. The inventive method involves detecting the bed boundaries of the laminated formation, thereby detecting the individual beds disposed between the boundaries including the thin beds. Also, a set of defined facies associated with the laminated formation is imported, which includes a volumetric description for each of the defined facies. Then, a value of the formation property for a plurality of the thin beds is estimated, which includies for each of the plurality of thin beds, computing a value of the formation property from one of the imported volumetric descriptions.

Preferably, the step of generating at least one squared log of the formation property includes performing the estimating step for a plurality of the detected beds. More preferably, the squared log of the formation property is optimized. This may require generating a reconstructed log from the squared log and then comparing the reconstructed log with a measured log for the laminated form ation. Subsequently, the values of the squared log are adjusted to minimize the difference between the reconstructed log and the measured log, thereby generating an optimized squared log.

Alternatively, the squaring, obtaining, and matching steps of the assigned step may be applied to a plurality of high resolution logs and a corresponding plurality of property values, and, thus, a defined facies is assigned with the thin bed.

BRIEF DESCRIPTION OF DRAWINGS

A complete understanding of the present invention will be obtained from the Detailed Description of the Invention presented herein below, and the accompanying drawings, which are given by way of illustration only and are not intended to limit the present invention, and wherein.

DETAILED DESCRIPTION

The present invention relates generally to a system and method for analyzing formations, and more particularly, such a system and method for determining certain physical characteristics or properties with each of the layers of the laminated formation having thin beds therein. In one application of the invention, a method is provided for estimating the values of one or more physical properties of each of the layers of the laminated formation. These physical properties or characteristics may include resistivity, conductivity, gamma ray, porosity, and other commonly desirable physical properties. The characteristics of the laminated formation may also be determined or estimated in the form of a volumetric analyses over the depth of the laminated formation. Such a volumetric analyses will include the determination of volumes associated with each layer. Such volumes determines the amount of fluids (oil, water, gas, etc.) and solids (quartz, sand, etc.) present in the formation at the different depths of the wellbore. Interpretation software is available to conduct the volumetric analyses on one or more measurement logs of properties of the formation, the measurements being performed by a well logging tool.

U.S. Pat. No. 5,461,562, entitled "Method and Apparatus for Detecting and Quantifying Hydrocarbon Bearing Laminated Reservoirs on a Workstation", issued to Tabanou, et al. and assigned to Schlumberger Technology Corporation, discloses an interpretation system and method for receiving a low resolution log and a high resolution log from a well logging tool, to generate an output record medium having the above described formation property log and volumetric analyses. The present invention provides both improvements and modifications to the various aspects of the system, apparatus, and method described in the '562 patent. The present description of the invention should, therefore, be read in conjunction with the specification of the '562 patent. For this reason, U.S. Pat. No. 5,461,562 is incorporated by reference for all purposes and made a part of the present disclosure. Throughout the present description, references may be made to specific disclosures or discussions and illustrations provided in the '562 patent.

To facilitate the description of various embodiments of the invention, the following definitions are provided. It should be understood, however, that each of the terms and definitions should be readily understood from the reading and viewing of the rest of the present disclosure and, separately, from the general knowledge of one skilled in the relevant petrophysical, geological, petroleum engineering, and other relevant art. Thus, the following definitions of terms are provided only to facilitate the present description and understanding of the preferred embodiments of the invention.

Figure 1:
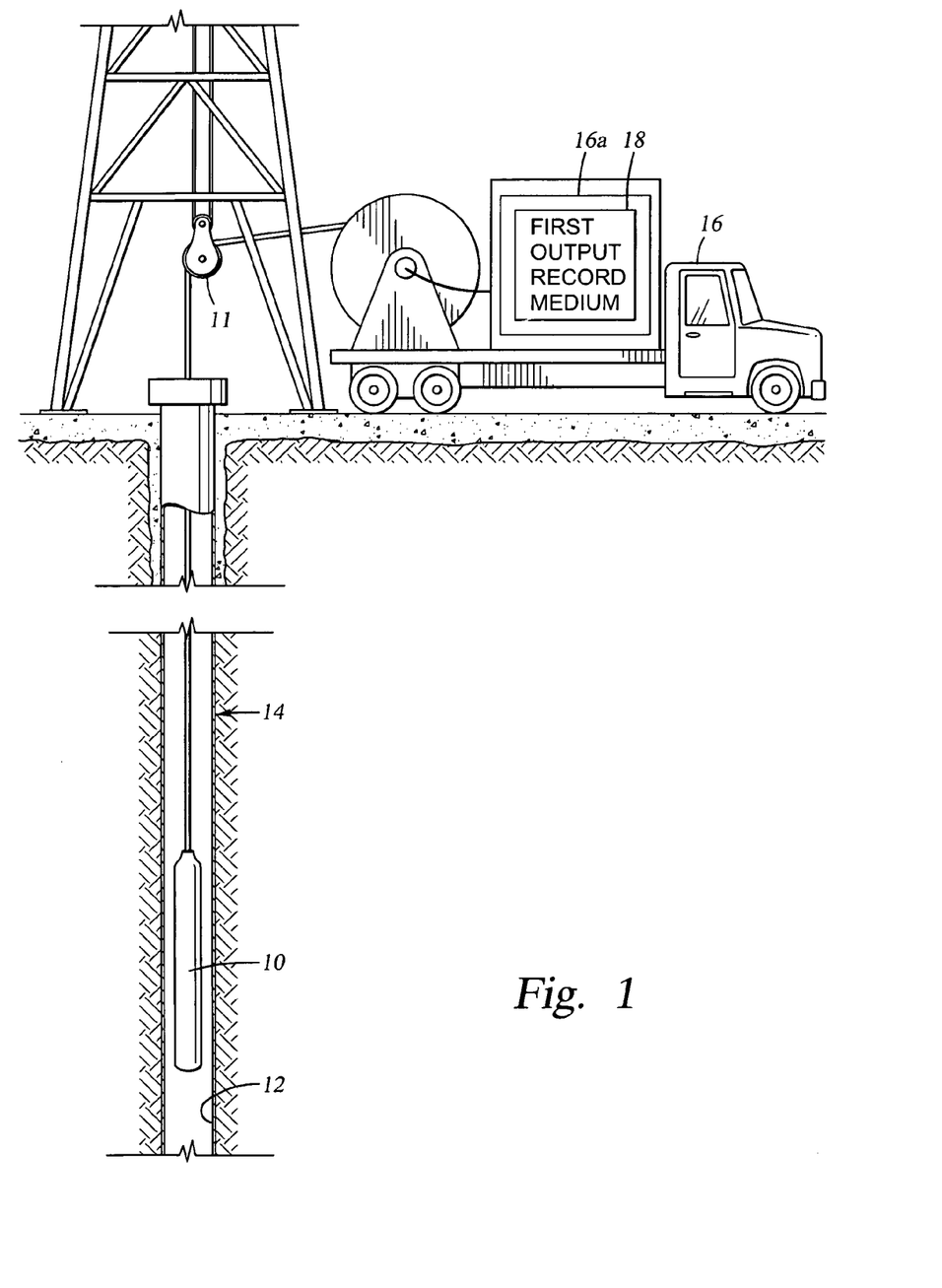
FIG. 1 is a diagram illustrating a well logging operation in a wellbore that traverses a laminated formation.

Referring to FIG. 1, a well logging truck 16 is shown parked at the surface of a wellbore 12 that traverses a laminated formation 14. The truck 16 is operatively associated with a common well logging tool 10 that is disposed in the wellbore 12. Since the formation 14 is laminated, it comprises a multitude of layers, one on the other, some layers being thicker in depth than others and some, qualifying as "thin beds". In addition, some layers are comprised of a material (and fluid) that is different than the material found in other layers. As is generally known, the well logging tool 10 transmits energy into the formation 14, receives a signal response from the formation 14, and then generates output signals that are representative of physical properties of the formation. The output signals are transmitted uphole and recorded or output, in the form of measurement logs. The measurement logs are received by the well logging truck 16, and more specifically, by a computer 16a in the truck 16. The computer 16a records the measurement logs on a first output record medium 18. The first output record medium 18 could be a computer printout, or it could be a magnetic tape or other form of recording medium for storing or recording the logs therein. The logs printed or recorded on the first output record medium 18 represent physical characteristic or properties of the laminate formation, such as conductivity or resistivity, over the different depths.

Figure 2:
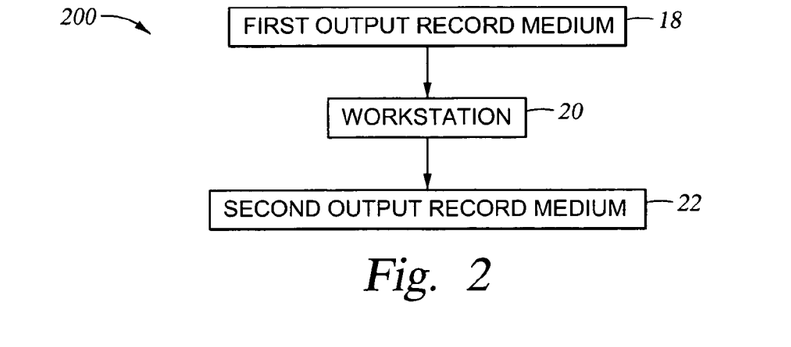
FIG. 2 is a simplified flow chart illustrating the process of converting an output record medium generated from wellbore logging measurements to a more refined output record medium.

Referring to the basic flow chart 200 of FIG. 2, the first output record medium 18 may be subsequently transferred from the well logging truck 16 to a workstation 20, wherein the logs are interpreted, by interactive interpretation software. The interpretation software is executable by the workstation 20 processor to determine the specific properties of each of the layers of the laminated formation. This interpretation or analyses may determine the type of material (such as quartz, water, gas, oil, etc.) that comprises each layer of the multitude of layers of the laminated formation 14.

One such interpretation software (known as Expert Log Analysis or ELAN) may be employed to perform a volumetric analysis on the logs. A volumetric analysis attempts to determine, by calculating certain volumes $V_j$, the type of solids and fluids that make up each layer of the multitude of layers of the laminated formation. A second output record medium 22 is then generated which records or stores the type of material or fluids associated with each layer of the laminated formation. This volumetric analysis as performed by ELAN which is generally known, is discussed, in more detail, in the Detailed Description of the Preferred Embodiment of the "562 patent. Furthermore, the volumetric analysis service, performed by the ELAN interpretation software, may be obtained by contacting Schlumberger Technology Corporation, P.O. Box 2175, Houston, Tex. 77252-2175. It should be noted, however, that other volumetric analyses programs, software, or other means are generally available or accessible to one skilled in the relevant art, and may be suitable for use with the present invention or incorporated as a part thereof.

Figure 3:
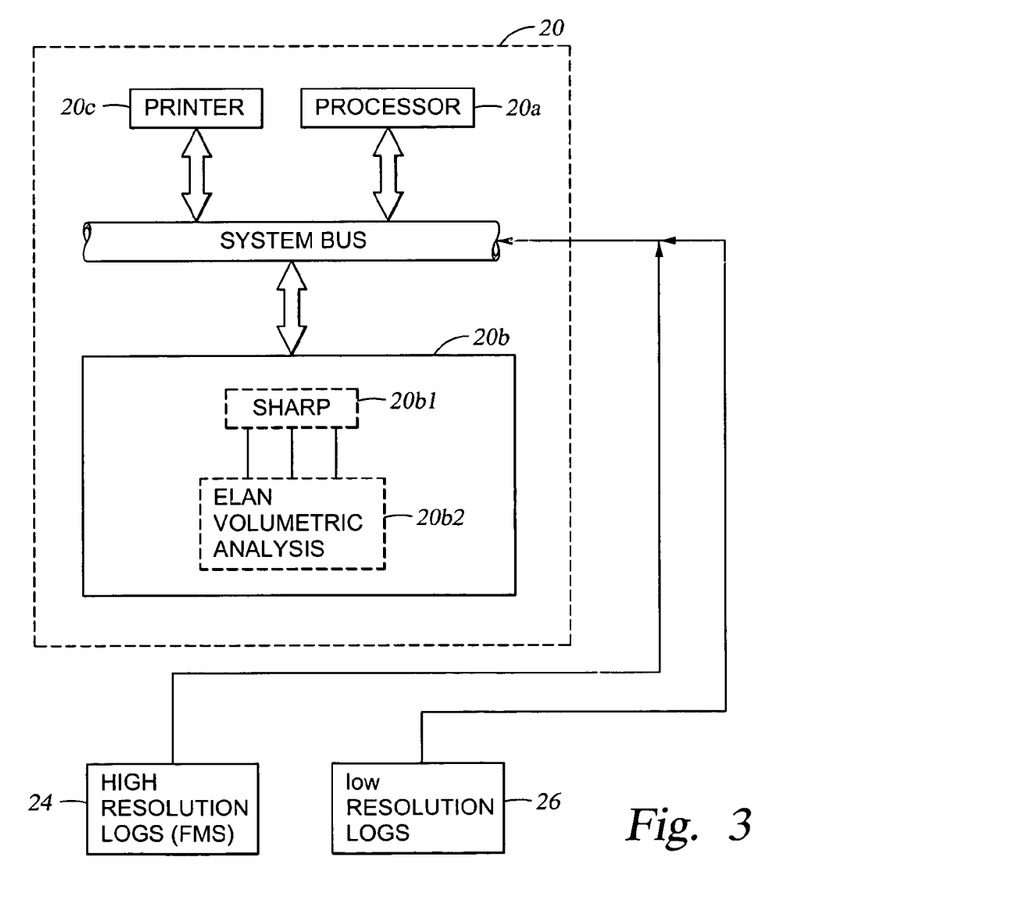
FIG. 3 is a graphical representation of the construction of a prior art workstation for analyzing laminated formation.

Referring to FIG. 3, a construction of a typical prior art workstation 20 utilizing the above-described methodology is illustrated. The workstation 20 may be any typical workstation, such as a SUN "Ultra 60." The workstation 20 may comprise a processor 20a, a memory 20b, a processor 20c, and system bus 20d connected to each of these components. The memory 20b stores, and the processor 20c executes, an interpretation software to generate the formation property logs from the measurement logs. One such interpretation software is the SHARP interpretation software further discussed herein and illustrated in FIG. 3. The memory 20b also stores the ELAN interpretation software for performing a volumetric analysis on the generated formation property logs.

Two types of logs are provided as input into the workstation 20. These include a high resolution log 24, such as the log produced by a high resolution tool known as the formation microscanner (FMS, FMI, or OBMI), and the low resolution log 26, such as a low resolution log produced by the Phasor Induction or Density tools. In operation, the processor 20a of the workstation 20 responds to the high resolution logs 24 and the low resolution logs 26 by first executing the SHARP software 20b1 then executing the ELAN interpretation software 20b2 in the logs generated by the SHARP software 20b1. A further detailed description of exemplary versions and applications of the SHARP software 20b1 and operation of the workstation 20, as well as execution of the ELAN software 20b2 is found in the '562 patent.

The results of operation of the workstation 20 may be embodied in the second output record medium 22. The second output record medium 22 is printed by the printer 20c and attempts to indicate the type of material and fluids that comprise each layer of the laminated formation 14.

Figure 4:
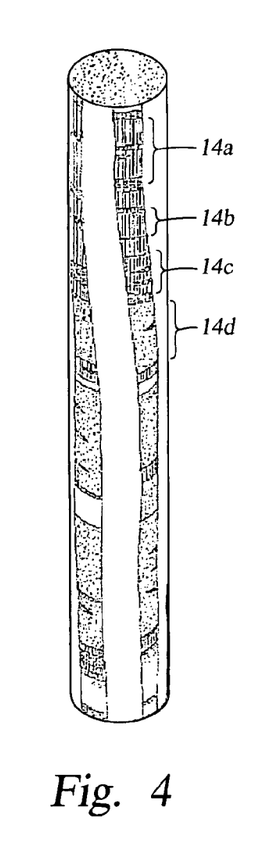
FIG. 4 illustrates a section of wellbore traversing a laminated formation, as developed by a high well resolution logging tool.
Figure 5:
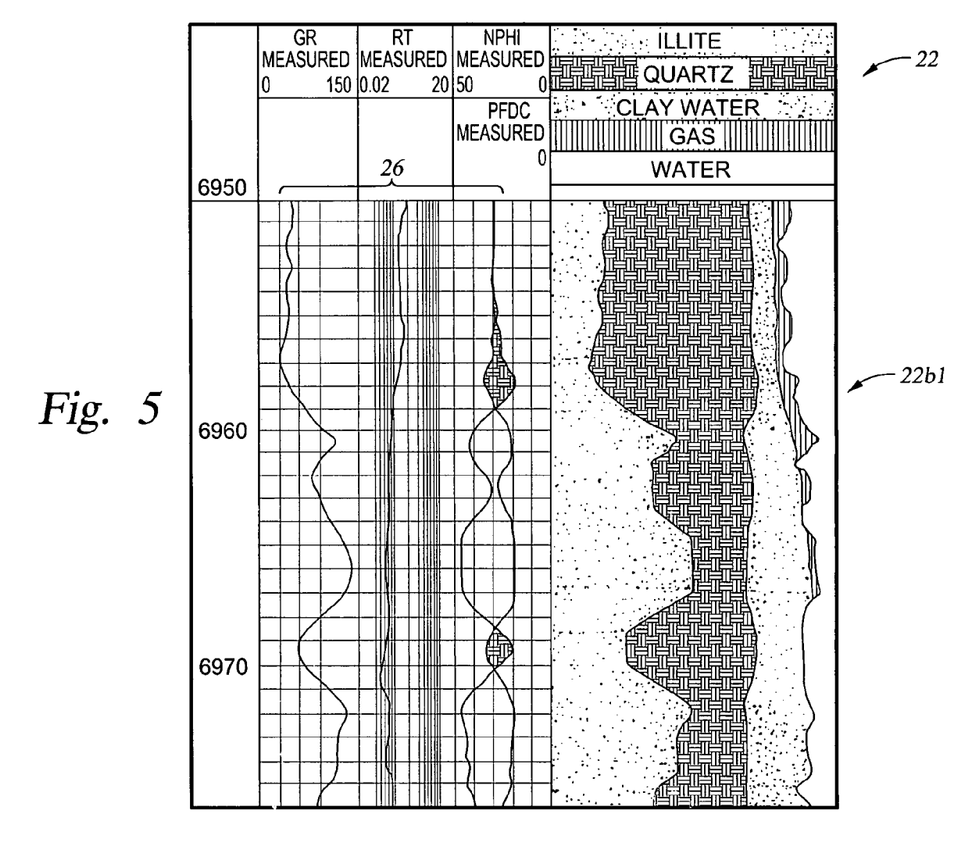
FIG. 5 illustrates an output record medium recording a plurality of refined logs of formation property and volumetric analysis on the logs.

FIG. 4 is an image provided for a typical laminated formation 14, as obtained from a high resolution FMS imager or from scanning a real full core. FIG. 5 illustrates a second output record medium 22 that includes a set of low resolution logs 26 from the laminated formation and low resolution volumetric analyses 22b obtained from the low resolution logs 26 (i.e., using ELAN or other suitable volumetric analysis software).

The layering of the laminated formation 14 may be developed by a high resolution logging tool known as the Formation Micro Scanner (FMS). This particular section of the formation 14 includes a multitude of "shale" laminations interleaved with "sand" laminations extending from top to bottom of FIG. 4 along the depth of the wellbore. The multitude of shale laminations include a first shale laminations layer 14a, a second shale lamination layer 14b, a third shale lamination layer 14c, a fourth shale lamination layer 14d, etc. The sand lamination layers are the areas which are interleaved with the shale lamination layers 14a–14d. The problem of analyzing a formation having thin beds such as the laminated formation 14, is discussed in more detail in the '562 patent. The '562 patent provides the second output record medium 22b in FIG. 5 as an example of the result of the method of estimating the properties of a laminated formation having thin beds prior to the availability of the SHARP method. The second output record medium 22b provides low resolution logs that do not accurately account for the properties in the thin beds, such as layers 14a–14d. As a result, the volumetric analyses performed on these logs, do not account or represent these thin beds.

Figure 5A:
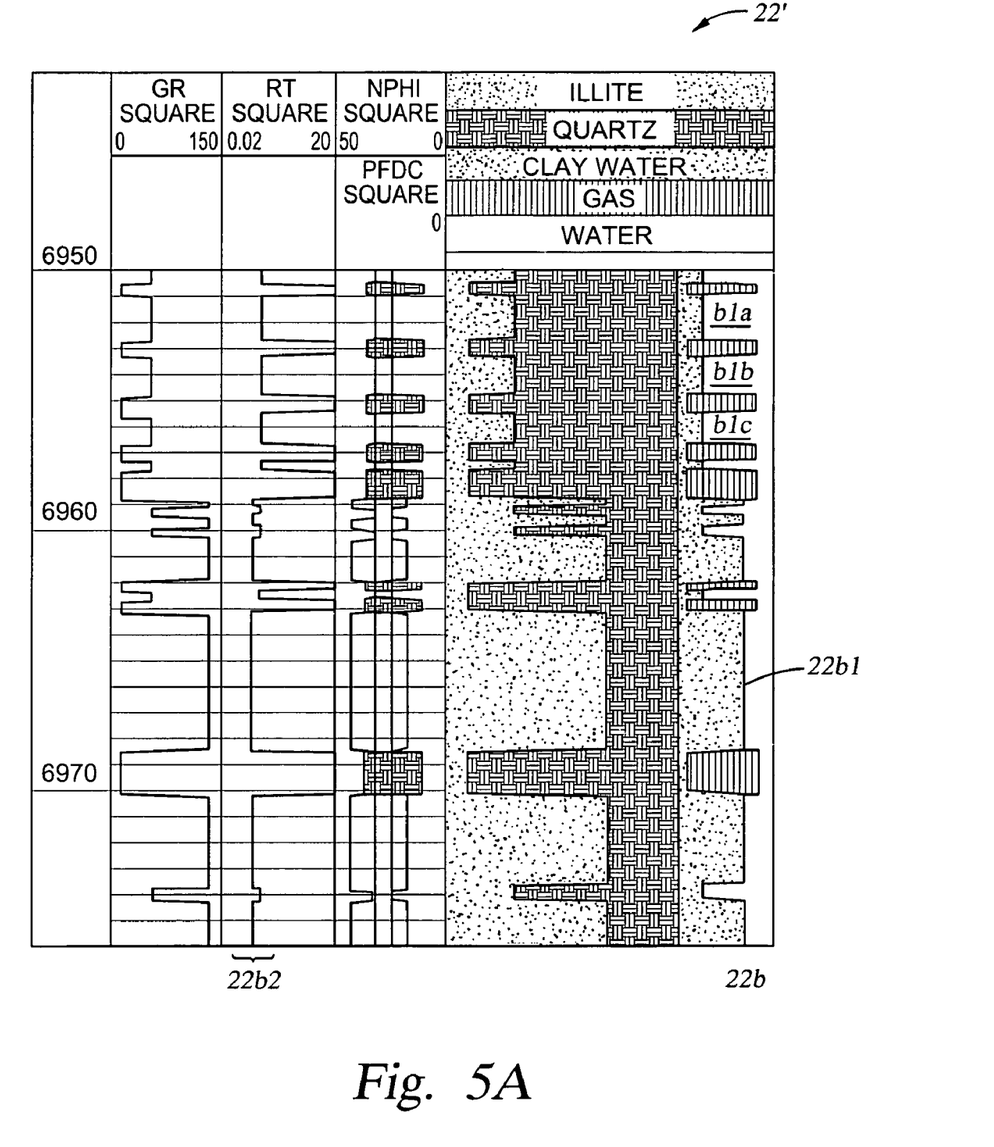
FIG. 5A is a prior art output record medium representing certain properties or characteristics of a laminated form ation.

FIG. 5A depicts an improved second output record medium 22' obtained through use of the SHARP method in conjunction with a high resolution log obtained, for example, from an FMS source. In this manner, the standard low resolution logs 26 of FIG. 5 are deconvolved to generate the higher resolution logs 22b2 of FIG. 5A. The logs 22b2 can then be processes by ELAN, or other suitable volumetric analysis soaftware, to generate the volumetric analysis 22b of FIG. 5A.

The SHARP method is, therefore, executed to estimate the formation characteristics or properties of the laminated formation. This estimation is represented by the plurality of squared low resolution logs 26 generated by the SHARP software and a volumetric analysis 22b of the squared low resolution logs 26, as shown in FIG. 5A.

Figure 6:
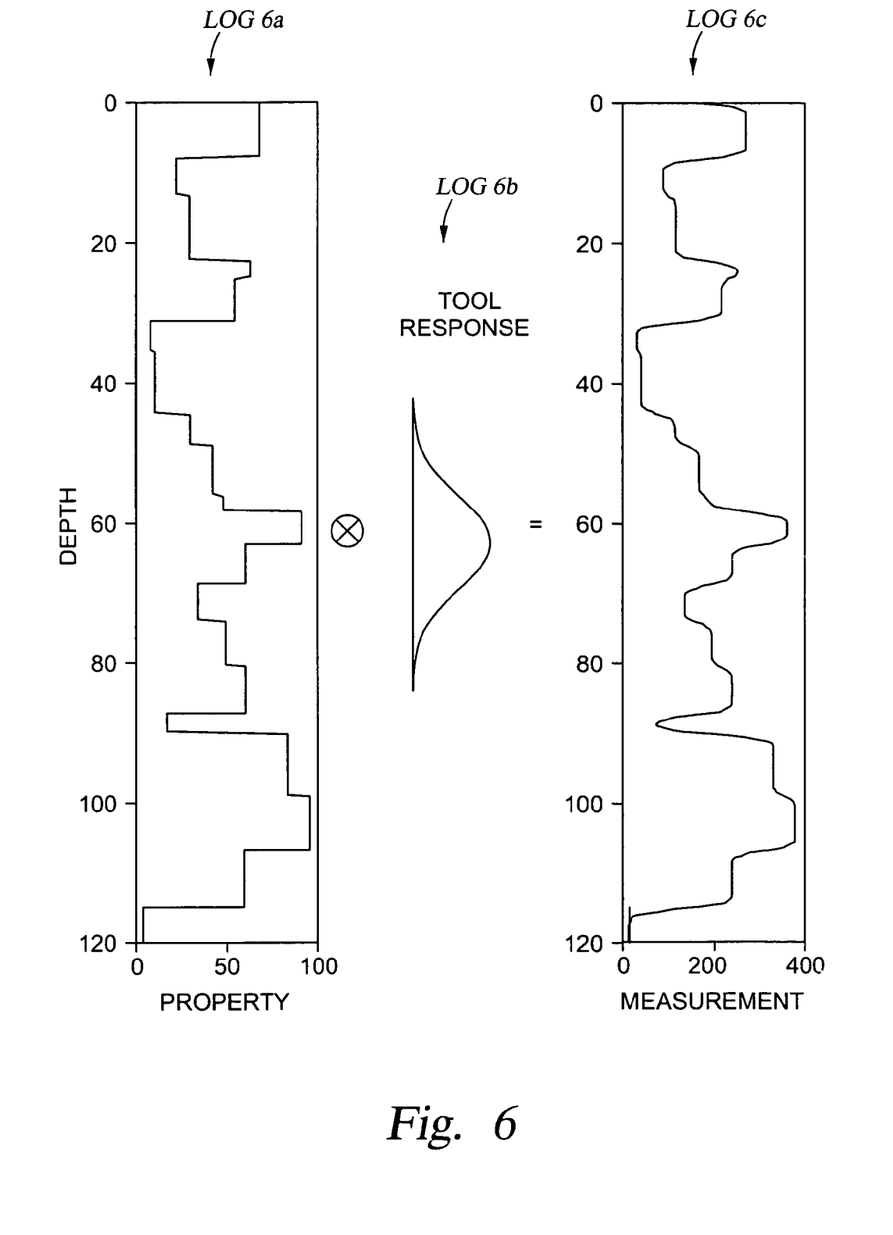
FIG. 6 is a simplified diagram illustrating a method of estimating the values of a formation property for a laminated formation having thin beds therein.

FIG. 6 represents the basic prior art methodology described above for estimating thin bed formation properties. On the left hand side, a formation property log 6a is provided for a property such as resistivity, density, etc. The formation property log 6a is a square log of the property over depth, and is generated by squaring a high resolution resistivity measurement log. The formation property log 6a is convolved using the tool response characteristic (i.e., known vertical response function), as represented by log 6b, to obtain a reconstructed log to compare with the measurement data log 6c. Through human effort and a computer program, the bed properties from the square log 6a are adjusted so as to minimize the difference between the formation property log 6a and the measurement data log 6c.

The above-described basic methodology is embodied in the interpretation software entitled "Synergetic High Resolution Analysis and Reconstruction for Petrophysics Evaluation (SHARP)," and more current versions of the methodology including those entitled "SHARP GF" and "SHARP LITE," each of which, including documentation, is available from Schlumberger Technology Corporation, Houston, Tex. Various aspects of the methodology and related aspects are described in the '562 patent, which has been incorporated by reference for all purposes and made a part of the present disclosure).

In the prior art SHARP method of estimating thin bed formation properties, a very high resolution resistivity measurement (e.g., SRES from FMI) is obtained for the laminated formations. The high resolution log covers the depth of the subject formation and each of the beds therein. The location of each of the beds and the bed boundaries are not, however, readily evident from the log. Typically, a square log block program is used to detect significant inflection points on the resolution log. The inflection points are interpreted as bed boundaries and used to construct the squared version of the high resolution log, wherein the property value within each bed is constant. In the SHARP method, the beds are identified from the detected bed boundaries and then classified in a few lithofacies (e.g., sand, shale, silt, and wet). From the squared high resolution log, an initial set of low resolution logs are generated. In particular, the squared low resolution log is used as a facies indicator, thereby generating the initial lithofacies model for the formation. The property values for the beds are then estimated from the high resolution logs. Next, a convolution filter is applied to the low resolution log to obtain a reconstructed convolved log. For each low resolution log, a specific convolution filter (which is generally known to one skilled in the art) is derived from the vertical tool response characteristics of the log.

At this point, the bed property optimization process begins. The reconstructed convolved log is compared against the input low resolution measurement log, with the objective of minimizing the difference between the two. If the comparison does not meet the requirements of the user, further refinement is required. Specifically, the bed property values is adjusted in the deconvolved log. The deconvolved log is then again convolved and the resulting reconstructed convolved log is compared with the input low resolution measurement log. Multiple iterations may be required to minimize the difference between the reconstructed convolved log and the input low resolution log. When the operator is satisfied with this comparison, an optimized reconstructed deconvolved log is identified.

With the optimized reconstructed deconvolved log, a volumetric analysis is performed. As discussed previously, the ELAN method may be implemented to generate the volumetric analysis of the thin bed formation depicted in FIG. 7. The log in FIG. 5 also displays the retained or deconvolved logs upon which the ELAN volumetric analyses are performed. A more detail description of this prior art method may be found in the '562 patent, and should be consulted for any clarification.

Applicants have discovered certain important limitations in the above-identified prior art method. Applicants recognize, for example, that the answer provided by the method may not be unique. That is, several distributions of properties (square logs) may be generated that can be convolved to compare well and thus "match" with the same low resolution measurement data log. Further, the minimization or optimization steps are done on a property by property basis. Applicants recognize, however, that rock properties are not independent from each other, and that ignoring this interdependence, may result in spurious solutions.

In utilizing the above described prior art method, users have to manually depth match the logs and manually adjust the properties in many layers. Because such a process is time consuming, the final interpretation is often not provided soon enough to have a real time impact on operations. Furthermore, in the prior art methodology, the very high resolution resitivity measurement used to identify bed boundaries and classify beds into several lithofacies are not always sufficient to distinguish unequivocally the facies. This may result in missing a bed boundary between two neighboring beds of different facies, but similar resistivity, for example. The methodology can also result in forcing two different facies to be the same when they only have similar resitivity.

Figure 7:
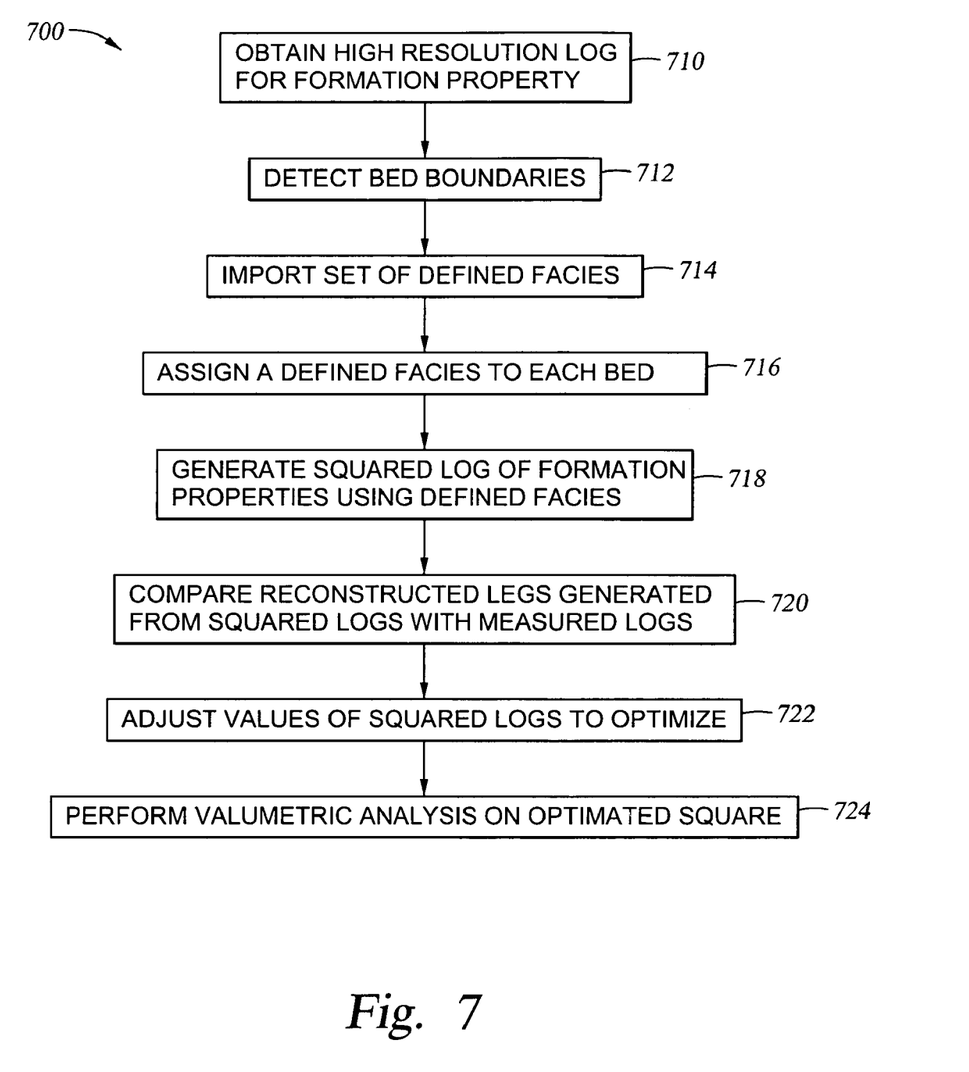
FIG. 7 is a flow chart of a method of analyzing the physical properties or characteristics of a laminated formation, according to the present invention.

FIG. 7 provides a flow chart 700 representing the basic steps in the inventive method for estimating thin bed properties or otherwise determining certain physical characteristics or properties of the various layers of the laminated formation. In an initial step 710 of the method, a high resolution log of a formation property is obtained. From this high resolution log, the bed boundaries are detected, including the beds within the boundaries (step 712). Separately, in one aspect of the invention, a set of defined facies is imported for the formation, volumetric descriptions for each of the facies (step 714). As will be explained below, the facies definition, and more particularly, the volumetric description associated with each facies, is imported from volumetric analyses performed on beds of the same or similar well, or same formation. This is, of course, particularly applicable to determining the properties or characteristics of thin beds in the laminated formation. Using the high resolution log, each bed is then assigned to one of the defined facies (step 716).

In a subsequent step 718 of the method, squared logs of the formation properties are generated from the facies definition. The property values for the squared logs (i.e., constant values between bed boundaries) are obtained from the facies" volumetric analyses.

In yet another aspect of the invention, several formation property logs are generated and optimized simultaneously. This aspect of the inventive method takes into account interdependence between the formation properties, thereby providing a more stable solution. Thus, from one or more of the generated squared logs for the formation properties, the next step 720 of the method is to compare reconstructed logs of the squared logs with measured logs (e.g., actual wellbore measurements). Then, depending on the results of the comparisons, the values of the squared logs may be adjusted one or more times so as to obtain optimized squared logs (step 722). The result of this optimization is one or more squared logs of a formation property for the subject laminated formation. Given the optimized squared logs, various post processing operations can be employed. For example, a volumetric analysis can be performed on each of the optimized squared logs (step 724), thereby generating an output such as the second record output medium 22' provided in FIG. 5A.

Figure 8:
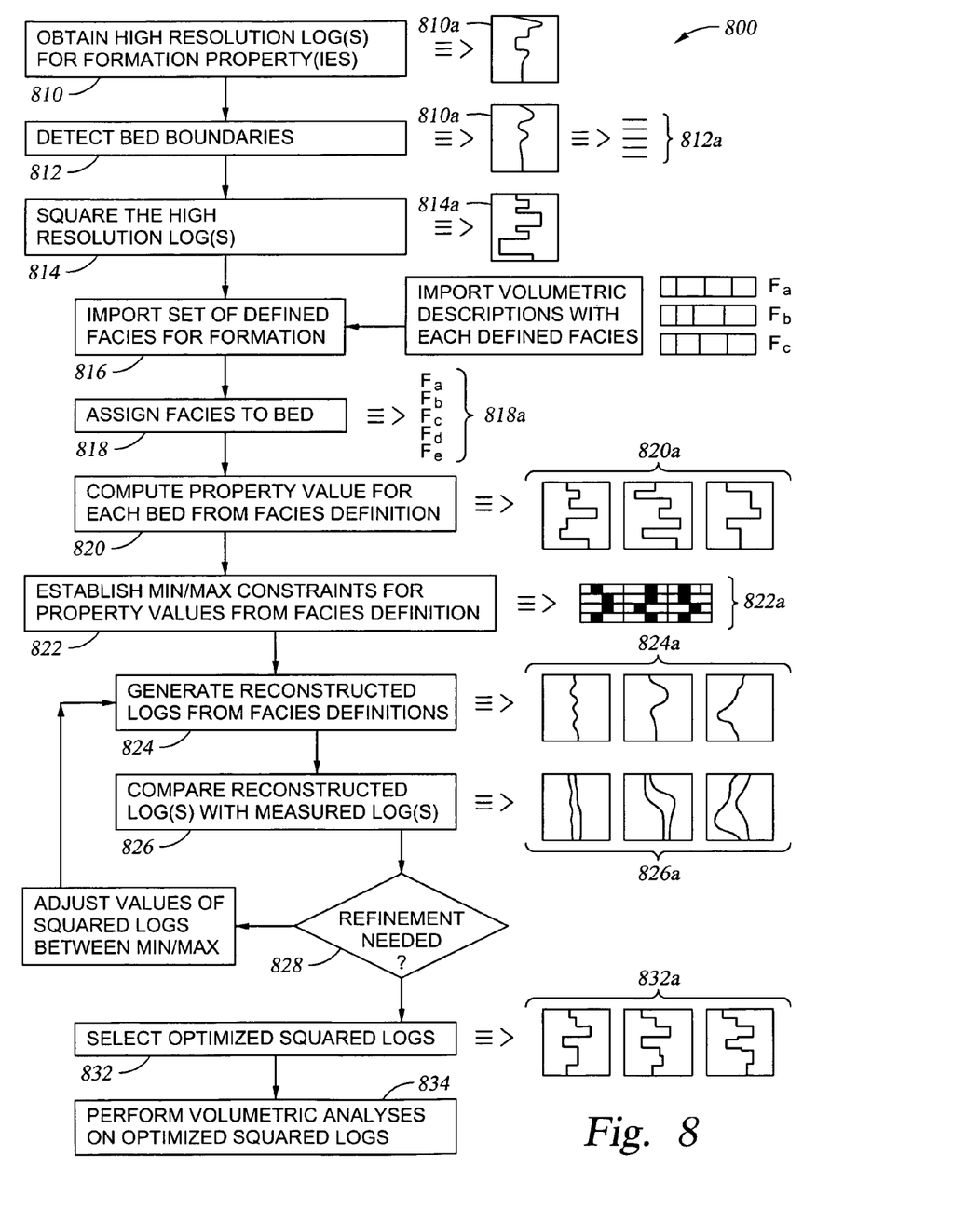
FIG. 8 is a diagrammatic flow chart illustrating the steps of the inventive method of estimating thin bed formation properties.

FIG. 8 provides, in more detail, a diagrammatic flow chart 800 illustrating preferred steps of the inventive method for estimating thin bed formation properties from one or more high resolution measurement logs. It should be noted that, with the inventive method, one or more formation properties, and more specifically, logs of the formation properties may be obtained, as will become apparent upon reading the description provided below and/or viewing the accompanying drawings.

In an initial step 810 of the method, one or more high resolution logs 810a is obtained for one or more formation properties. For example, a high resolution shallow resistivity log generated from a Fullbore Formation MicroImager (FMI), or an Oil Based Mud Imager (OBMI), or some other microresistivity device, may be obtained. Various applications of the inventive method may utilize a plurality of high resolution logs, but, generally one log will suffice. Other high resolution logs that can be used are very high resolution measurements generated by Schlumberger's Platform Express (PEX) tool. In a second step 812 of the inventive method, the bed boundaries are detected from the high resolution log 810a. The set of bed boundaries 812a also identifies the beds which are located between the bed boundaries, and over the entire depth of the laminated formation. The step of detecting bed boundaries 812 is typically performed in conjunction with the step 814 of squaring the high resolution log (to obtain an initial squared log of the formation property 814a). Given the tool response for the subject measurements, the high resolution log 810a is squared, in accordance with generally known methods.

From the squared high resolution log, a value for the formation property for each bed may be obtained. The squared log 814a provides a distribution of the values of the formation property versus depth. Typically, the squaring algorithm relies on identifying second derivative inflections and, thus, the formation depths corresponding to each of these inflection points. By identifying these specific depths or interval, the bed boundaries of the formation are located. In the squared high resolution log 814a illustrated in the flow chart 800, these bed boundaries correspond, of course, with the right angle points or breaks in the squared log 814a or the transitions between different constant values (vertical line) of the formation property. Again, by identifying the bed boundaries, the individual beds between the bed boundaries are also identified, including the thin bed formations.

In an important aspect of the present invention, the next step 816 of the inventive method entails importing a set of defined facies for the formation. The set of defined facies is external information that is associated with the subject laminated formation. This facies definition includes volumetric descriptions for each of the facies 817. These volumetric analyses, characterized by a series of Elan volumes, for example, may be imported from a set of volumetric analyses performed on thick beds in the same or similar formation. Applicants recognize that, in many thick bed environments (such as turbidite reservoirs), the lithology of thin beds is the same or substantially the same as the lithology of thicker beds in the same formation in the same wellbore or a neighboring wellbore. In a preferred embodiment, the method utilizes volumetric analyses performed by the ELAN program. Alternatively, core data or reasonable knowledge of the formation may be entered manually by the user to define these facies.

With the bed locations identified, the method then assigns or determines a facies to each of the beds (step 818). In the preferred application of the inventive method, squared high resolution logs for the subject formation are used to determine a value for the property, e.g., resistivity. This value(s) is then matched with a facies that generates, from the volumetric analyses, the same value or value range, thereby assigning that facie to the bed. If only one high resolution log is used, the assignment of a facies to a bed is preferably performed on an histogram. If several high resolution logs are used, the assignment is preferably performed using a cross-plot. In this case, one or more property values for each bed is matched with a facies generating the two values or value ranges. If more than two high resolution logs are used, a multi-dimensional cluster analysis may be used to identify a set of formation facies or a depth interval under evaluation.

In the flow chart 800 of FIG. 8, the volumetric analyses corresponding to each defined facies ($F_1$ through $F_n$) is represented in the illustration 816a. Once a particular facies definition is assigned to each bed, or more particularly, a volumetric description for each bed, the values of the formation property for each bed may be computed 820. These property values are computed, as is now generally known in the art, from the volumetric description of the facies using the ELAN software, for example. Basically, this value (which is represented by the vertical line or constant amplitude of the squared log) may be obtained for each bed in the laminated formation. It should be noted that the values of the thick beds, at least on the squared log, may be obtained by taking the median of the high resolution log measurements for that bed. Alternatively, the values of the formation property for the thick beds may be obtained from the facies definition, and more particularly, from the volumetric description of the facies.

In yet another aspect of the inventive method, the method includes a step 822 of establishing optimization constraints for the property values in the squared logs 820a. Generally, these constraints are primarily minimum/maximum values for the property values for each bed, as obtained from the facies definition. Preferably, these minimum/maximum values are computed from uncertainties known from the volumetric description of the facies (e.g., employing the Monte Carlo method). These minimum/maximum constraints are represented in a matrix table 822a, as shown in the flow chart 800.

As previously mentioned, in a preferred application of the inventive method, a plurality of logs of various formation properties are obtained. As shown in FIG. 8, a set of squared log 820a representing these formation properties are generated from the step 820 of computing the property value for each bed in the laminated formation. In a subsequent step 824 of the method, reconstructed logs 824a of the values of subject properties are obtained from the squared logs 820a. These reconstructed logs 824a are generated utilizing commonly known methods of converting square logs to reconstructed logs, such as forward modeling techniques and convolution filters (see e.g., description in the '562 patent).

Next, the inventive method requires a step 826 of comparing the reconstructed logs 824a with actual measured logs. That is, each of the reconstructed logs, which is generated from squared low resolution logs based on the facies definition, is matched up with and compared with a low resolution measurement log corresponding to the formation property to be determined. The graphical illustrations 826a represent the comparisons of three sets of reconstructed logs measurement logs combinations. To optimize the solution(s) to the method, the user or operator determines whether the difference between the reconstructed logs and the measurement logs are sufficiently large to require further refinement (step 828). The objective of this optimization is to minimize the difference between corresponding logs, i.e., the area between the corresponding logs. Suitable techniques, algorithms, or programs to effect the comparing step (and subsequent parameter adjusting step 830) are generally known and used (see e.g. the '562 patent).

It should be noted that, in the preferred method, comparisons between reconstructed logs and low resolution logs may be performed simultaneously. Consequently, in a subsequent step 830 of the method, the parameters of the squared logs 820a from which the reconstructed logs are derived, are adjusted. These parameters are primarily the values of the property between the bed boundaries (in each bed). These adjustments are, of course, made within the minimum/maximum constraints obtained for each bed, thereby simplifying (and shortening) the process. As shown in the flow chart 800, the method subsequently generates a new set of reconstructed logs 824. The process then returns to the step 826 of comparing the reconstructed logs with the measured logs of the formation properties. At some point in the process, the operator will be satisfied with the result of the comparison step and choose not to refine the reconstructed logs. The optimized squared logs for the formation properties are therefore selected 832 (see logs 832a). These optimized squared logs 832a may then become the subject of post processing operations including volumetric analysis, e.g., using ELAN, to obtain the various volumetric descriptions. In another know post-processing operations, mechanical properties are determined from the optimized squared logs 832a.

Figure 9:
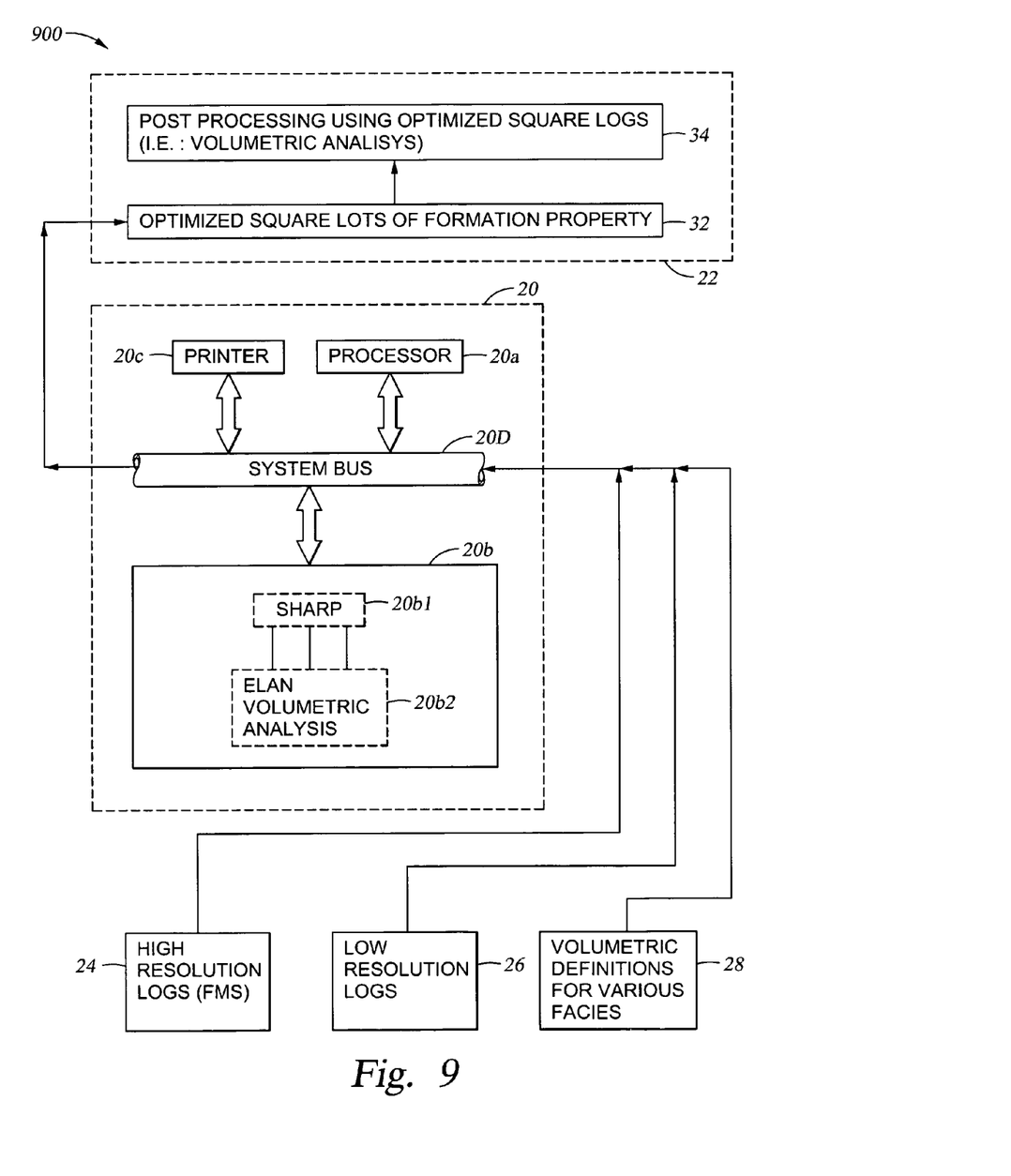
FIG. 9 is a graphical representation of a system for analyzing the physical properties or characteristics of the laminated formation, according to the present invention.

FIG. 9 is a simplified diagram of the system 900 for estimating the properties of a laminated formation having thin beds therein. FIG. 9 further depicts the workstation 20 according to the invention. The workstation 20 includes a processor 20a, a memory 20b, a printer 20c, and system bus 20d which connects all three components. As illustrated in the Figure, the memory 20b stores the ELAN volumetric analyses software 20b2 as well as a software embodying various aspects of the inventive method described above. Entitled SHARPER, the software 20b1 is operable to generate a second output record medium 22, as shown in FIG. 5. In analyzing a laminated formation having thin beds therein, the workstation 20 receives two types of logs as input. A first type of log is a high resolution log of the formation property over the depth of the subject laminated formation. As discussed above, one type of high resolution log 24 that can be provided as input is a high resolution shallow resistivity log developed from FMI or BMI, or some other microresistivity device. The high resolution logs 24 provide the starting point for detecting the bed boundaries and defining the facies for each of the beds. The inventive system 900 and workstation 20 further receives, as input, a plurality of low resolution logs 26, such as a log produced by the Phasor Induction or Density tools (or logs produced by other commercially accessibly modern logging tools such as the Array Induction and Array Laterolog tools). As discussed above, these low resolution logs 26 are used for comparing and optimizing the squared formation property logs generated by the system 900 from known volumetric descriptions.

In one aspect of the present invention, the workstation 20 further receives, as input, a database of volumetric analyses for facies expected to be encountered in the subject laminated formation. Preferably, this database is in the form of ELAN volumetric analyses conducted for thick-beds in the same laminated formation (e.g., in the same wellbore or neighboring wellbore), or similar (i.e., adjacent) laminated formations. Further, the volumetric analyses include facies definition characterized by a series of ELAN volumes. As discussed above, these volumetric analyses, i.e., ELAN volumes, provided as input to the ELAN volumetric analyses software so as to determine property values for the thin beds in the subject laminated formation (as well as thick-beds).

The workstation 20 also provides as output the plurality of optimized square logs of the formation properties of interest 32. The workstation 20 also provides the ELAN volumetric analyses performed on the optimized squared logs 34. Both the optimized squared logs and the ELAN volumetric analyses may be printed or displayed on the second output record medium 22. An exemplary second output record medium 22 is shown in FIG. 5.

The foregoing description of the present invention has been presented for purposes of illustration and description. It is to be noted that the above description is not intended to limit the invention to the various systems and methods disclosed herein. Various aspects of the invention as described above, may be applicable to other types of systems for analyzing the physical properties or characteristics of a laminated formation, and a method for performing the same. For example, the system and method described above may be adapted for analyzing a laminated formation other than one having thin beds therein. Moreover, the system and method may be applied to determine properties and characteristics of a formation other than those discussed in the exemplary applications. Such variations of the invention will become apparent to one skilled in the relevant petrophysical, geological, and engineering art provided with the present disclosure. Consequently, variations and modifications commensurate with the above teachings, skill and knowledge of the relevant art, are within the scope of the present invention. The embodiments described and illustrated herein are further intended to explain the best modes for practicing the invention. For this reason, the SHARPER method was discussed as well as improvements to previous versions of the SHARP method. Moreover, the embodiments described and illustrated herein are further intended to enable others skilled in the art to utilize the invention and all the other embodiments and various modifications required by the particular applications or uses of the present invention.

What is claimed is:

1. A method of determining a physical characteristic associated with a plurality of layers of a laminated formation traversed by a wellbore, said method comprising the steps of:

provided one or more high resolution logs of a formation property for the laminated formation;

from a high resolution log, detecting the bed boundaries of the laminated formation, thereby detecting the individual beds disposed between the boundaries;

importing a set of defined facies associated with the laminated formation, including importing a volumetric description with each of the defined facies;

assigning one of the defined facies, and the volumetric description associated therewith, to each of the beds detected;

generating at least one squared log for a formation property, including using imported volumetric descriptions of the facies for a plurality of beds to generate a value of the formation property for each of the beds;

comparing the squared log with a measured log of the formation property for the laminated formation;

adjusting the values of the squared log; and repeating, one or more times, said adjusting and comparing steps before selecting an adjusted squared log as an optimized square log of the formation property.

2. The method of claim 1, further comprising the step of performing a volumetric analysis on the optimized squared log.

3. The method of claim 2, further comprising the step of storing, on an output record medium, the optimized squared log and the corresponding volumetric analyses of the squared log, the volumetric analyses illustrating each layer of the plurality of layers of the laminated formation.

4. The method of claim 3, wherein the laminated formation includes thin beds, said storing step including storing volumetric analyses that includes an illustration of each of the thin bed layers in the laminated formation.

5. The method of claim 1, wherein said step of generating a squared log includes determining minimum and maximum constraints for the formation property values for a plurality of the beds, the minimum and maximum constraints being derived from the imported volumetric descriptions associated with each bed, and wherein said adjusting step includes adjusting the values of the squared log within corresponding minimum and maximum constraints.

6. The method of claim 1, wherein said comparing step includes generating a reconstructed log from the squared log and comparing the reconstructed log with the measured log; and
wherein said adjusting step includes adjusting the values of the squared log to minimize the difference between the reconstructed log and the measured log.

7. The method of claim 6, wherein said step of generating at least one squared log includes generating a plurality of squared logs of different formation properties and wherein, each of the comparing and adjusting steps are performed in respect to a plurality of reconstructed logs generated from the plurality of squared logs and a plurality of measured low resolution logs for the different formation properties, thereby selecting a plurality of optimized squared logs.

8. The method of claim 7, wherein each of said comparing and adjusting steps is performed simultaneously in respect to the plurality of generated reconstructed logs and the plurality of measured low resolution logs.

9. The method of claim 7, further comprising the steps of:
performing a volumetric analysis on the plurality of optimized squared logs; and
on an output medium, the optimized squared logs and a volumetric analysis for each of the beds of the laminated formation, the volumetric analyses illustrating each of the layers of the laminated formation.

10. The method of claim 7, wherein said step of generating a reconstructed log includes employing a convolution filter to convolve the squared log.

11. The method of claim 1, wherein said step of detecting bed boundaries include detecting the boundaries for a plurality of thin beds, and wherein said assigning step includes assigning one of the defined facies to one of the thin beds.

12. The method of claim 11, wherein said assigning step includes squaring the high resolution log;
obtaining a property value, from the high resolution log, for each of the thin beds; and
matching the value with a value derived from a volumetric description associated with one of the defined facies, thereby assigning said one of the defined facies with said thin bed.

13. The method of claim 12, wherein said assigning step includes assigning each of the thin beds a volumetric description derived from a thick bed located in the same laminated formation.

14. The method of claim 12, wherein said squaring, obtaining, and matching steps of the assigned step is applied to a plurality of high resolution logs and a corresponding plurality of property values, thereby assigning a defined facies with the thin bed.

15. The method of claim 1, wherein said importing step includes importing defined facies associated with thick beds in the same laminated formation.

16. The method of claim 1, wherein said step of generating a squared log includes computing an initial property value for a bed from the volumetric description assigned to the bed.

17. A method of estimating the values of a formation property for a plurality of layers of a laminated formation, the laminated formation having thin beds therein and traversed by a wellbore, said method comprising the steps of:
detecting the bed boundaries of the laminated formation, thereby detecting the individual beds disposed between the boundaries including the thin beds;
importing a set of defined facies associated with the laminated formation, including importing a volumetric description for each of the defined facies; and
estimating a value of the formation property for a plurality of the thin beds, including, for each of the plurality of thin beds, computing a value of the formation property from one of the imported volumetric descriptions.

18. The method of claim 17, further comprising the step of generating at least one squared log of the formation property by performing said estimating step for a plurality of the detected beds.

19. The method of claim 18, further comprising the steps of:
optimizing the squared log of the formation property, including
generating a reconstructed log from the squared log;
comparing the reconstructed log with a measured log for the laminated formation; and
adjusting the values of the squared log to minimize the difference between the reconstructed log and the measured log, thereby generating an optimized squared log.

20. The method of claim 19, wherein said estimating step computes the initial property value for each of the beds, prior to said optimizing step.

21. The method of claim 19, further comprising the step of performing a volumetric analysis on the optimized squared log and displaying the volumetric analysis on an output record medium, the volumetric analysis illustrating each layer of the laminated formation including the thin beds.

22. The method of claim 17, further comprising the step of assigning one of the defined facies, and the volumetric description associated therewith, to each of the plurality of thin beds, said computing step including computing the value from the volumetric description assigned to the thin bed.

23. The method of claim 22, wherein said detecting step includes providing one or more high resolution logs of a formation property, and, from the high resolution log, detecting the bed boundaries.

24. The method of claim 23, wherein said assigning step includes the steps of:
squaring the high resolution log;
obtaining a property value, from the high resolution log, for each of the thin beds; and
matching the obtained value with a value derived from a volumetric description associated with one of the defined facies, thereby assigning the defined facies with the thin bed.

25. The method of claim 24, wherein each of said squaring, obtaining, and matching steps is applied to a plurality of high resolution logs and a corresponding plurality of property values, thereby assigning a defined facies with the thin bed.

26. The method of claim 19, wherein said step of at least one squared log includes generating a plurality of squared logs of different formation properties and wherein, each of the comparing and adjusting steps are performed in respect to a plurality of reconstructed logs generated from the plurality of squared logs and a plurality of measured low resolution logs for the different formation properties, thereby selecting a plurality of optimized squared logs.

27. The method of claim 26, further comprising the steps of:performing a volumetric analysis on the optimized squared logs; and displaying, on an output medium, the optimized squared logs and a volumetric analysis on the optimized squared logs for each of the beds of the laminated formation, the volumetric analyses illustrating each of the layers of the laminated formation.

28. The method of claim 19, wherein said step of generating a squared log includes determining minimum and maximum constraints for the formation property values for various facies, the minimum and maximum constraints being derived from imported volumetric analysis, and wherein said adjusting step includes adjusting each of the values of the squared log within corresponding minimum and maximum constraints.

29. The method of claim 28, wherein said step of generating a squared log includes computing an initial property value for a bed from the volumetric description assigned to the bed.

30. A computer implemented method of estimating the values of a formation property associated with a plurality of layers of a laminated formation traversed by a wellbore, said method comprising the steps of:
inputting one or more high resolution logs of a formation property for the laminated formation;
from a high resolution log, detecting the bed boundaries of the laminated formation, thereby detecting the individual beds disposed between the boundaries;
accessing a set of defined facies associated with the laminated formation, including importing a volumetric description with each of the defined facies;
assigning one of the defined facies, and the volumetric description associated therewith, to each of the beds detected;
generating at least one squared log for a formation property, including using imported volumetric descriptions of the facies for a plurality of beds to generate an initial value of the formation property for each of the beds;
comparing the squared log with a measured log of the formation property for the laminated formation;
adjusting the values of the squared log; and
repeating, one or more times, said adjusting and comparing steps to output an adjusted squared log as an optimized square log of the formation property;
wherein said step of generating a squared log includes determining minimum and maximum constraints for the formation property values for a plurality of the beds, the minimum and maximum constraints being derived from the imported volumetric descriptions assigned with each bed, and wherein said adjusting step includes adjusting the values of the squared log within corresponding minimum and maximum constraints.

31. The method of claim 30, further comprising the steps of:
performing a volumetric analysis on the optimized squared log; and
storing, on an output record medium, the optimized squared log and the corresponding volumetric analyses of the squared log, the volumetric analyses illustrating each layer of the plurality of layers of the laminated formation.

32. The method of claim 31, wherein the laminated formation includes thin beds, said storing step including storing a volumetric analyses that includes an illustration of each of the thin bed layers in the laminated formation.

33. The method of claim 30, wherein said comparing step includes generating a reconstructed log from the squared log and comparing the reconstructed log with the measured log; and
wherein said adjusting step includes adjusting the values of the squared log to minimize the difference between the reconstructed log and the measured log.

34. The method of claim 33, wherein said step of generating at least one squared log includes generating a plurality of squared logs of different formation properties and wherein, each of the comparing and adjusting steps are performed in respect to a plurality of reconstructed logs generated from the plurality of squared logs and a plurality of measured low resolution logs for the different formation properties, thereby selecting a plurality of optimized squared logs.

35. The method of claim 30, wherein said step of detecting bed boundaries includes detecting the boundaries for a plurality of thin beds, and wherein said assigning step includes assigning one of the defined facies to a plurality of thin beds.

36. The method of claim 35, wherein said assigning step includes,
squaring the high resolution log;
obtaining an initial property value, from the high resolution log, for each of the thin beds; and
matching the value with a value derived from a volumetric description associated with one of the defined facies, thereby assigning the defined facies with the thin bed.

37. The method of claim 36, wherein said assigning step includes assigning each of the thin beds a volumetric description derived from a thick bed located in the same laminated formation.

38. The method of claim 36, wherein said squaring, obtaining, and matching steps is applied to a plurality of high resolution logs and a corresponding plurality of property values, thereby assigning a defined facies with the thin bed.

* * * * *